United States Patent [19]

Born et al.

[11] Patent Number: 4,645,610

[45] Date of Patent: Feb. 24, 1987

[54] METHOD FOR THE PREPARATION OF OLEFIN POLYSULFIDES, THE PRODUCTS OBTAINED AND THEIR UTILIZATION AS LUBRICANT ADDITIVES

[75] Inventors: Maurice Born, Nanterre; Guy Parc; Lucienne Briquet, both of Rueil Malmaison; Daniel Paquer, Vandoeuvre, all of France

[73] Assignee: Institut Francais du Petrole, Rueil-Malmaison, France

[21] Appl. No.: 725,278

[22] Filed: Apr. 19, 1985

[30] Foreign Application Priority Data

Apr. 20, 1984 [FR] France ............................ 84 06278
Oct. 10, 1984 [FR] France ............................ 84 15641

[51] Int. Cl.$^4$ .................. C10M 135/00; C07C 149/00
[52] U.S. Cl. ........................................ 252/45; 568/18; 568/21; 252/488
[58] Field of Search ............... 252/45, 488; 568/18, 568/21

[56] References Cited

U.S. PATENT DOCUMENTS

| | | | |
|---|---|---|---|
| 2,565,493 | 8/1951 | Gardner | 252/45 |
| 2,708,199 | 5/1955 | Eby | 568/21 |
| 2,744,070 | 5/1956 | Baker et al. | 252/488 |
| 2,790,775 | 4/1957 | Hughes et al. | 252/45 |
| 2,790,833 | 4/1957 | Liao | 252/45 |
| 3,471,404 | 10/1969 | Myers | 252/45 |
| 3,697,499 | 10/1972 | Myers | 252/488 |
| 4,132,659 | 1/1979 | Hotten | 252/488 |
| 4,204,969 | 5/1980 | Papay et al. | 252/45 |
| 4,217,232 | 8/1980 | Braid | 252/45 |
| 4,225,488 | 9/1980 | Horcdysky et al. | 252/45 |
| 4,240,958 | 12/1980 | Braid | 252/45 |
| 4,284,520 | 8/1981 | Bolle et al. | 568/21 |
| 4,344,854 | 8/1982 | Davis et al. | 252/488 |

*Primary Examiner*—William R. Dixon, Jr.
*Assistant Examiner*—Cynthia A. Prezlock
*Attorney, Agent, or Firm*—Millen & White

[57] ABSTRACT

A method for the preparation of olefin polysulfides that can be used in particular as extreme pressure additives for lubricants is described. This method comprises: (1) reacting sulfur monochloride or dichloride with at least one mono-olefin containing 2 to 5 carbon atoms (in general isobutene) resulting in the formation of an adduct; (2) bringing into contact said adduct, conjointly with a hydrocarbyl halide, with a sulfur compound (for example, alkaline sulfides, hydrosulfides or polysulfides) and, in most cases, elemental sulfur, in an aqueous or aqueous-alcoholic medium; (3) heating the mixture and, after it has settled into two phases, separating the organic phase containing the olefin polysulfide; and if necessary (4) treating the product obtained with a base.

The olefin polysulfides obtained contain a high proportion of sulfur, have a satisfactory viscosity and are sufficiently soluble in mineral oils as well as synthetic oils to be used as extreme pressure additives in the formulation of gear oils. Some of these products are also advantageous in the formulation of oils intended to be used in metal work.

49 Claims, 1 Drawing Figure

METHOD FOR THE PREPARATION OF OLEFIN POLYSULFIDES, THE PRODUCTS OBTAINED AND THEIR UTILIZATION AS LUBRICANT ADDITIVES

BACKGROUND OF THE INVENTION

The invention relates to the field of organic sulfur additives used in particular for improving the extreme pressure properties of lubricants; it relates more particularly to an improved method for the preparation of additives of the olefin polysulfide type and the products obtained by this method.

A number of methods intended for the preparation of olefin polysulfides that can be used as extreme pressure additives for lubricants are described in the prior art.

In particular, U.S. Pat. Nos. 3,471,404 and 3,697,499 describe a method whose principal steps are the following:

(1) Sulfur monochloride is reacted with an excess of an olefin containing 2 to 5 carbon atoms, in particular isobutylene, at a temperature of 20° to 80° C., in order to form an adduct;

(2) the adduct from the first step is reacted with an alkali metal sulfide (preferably sodium sulfide) and elemental sulfur, used in a ratio of 1.8 to 2.2 moles of metal sulfide per gram-atom of sulfur, the proportion of the alkali metal sulfide being in addition 0.8 to 1.2 mole per mole of adduct, and the reaction being carried out under reflux in the presence of an alcohol or an aqueous alcoholic solvent; and (3) The product obtained, which contains 1 to 3% chlorine, is reacted under reflux with an inorganic base in aqueous solution until the residual chlorine content of the product is less than 0.5%.

It is stated in these prior patents that the sulfur content of the products obtained can be 40 to 60% by weight. In fact, it is usually about 46% by weight. These products can be used as extreme pressure additives for lubricating oils, transmission fluids or greases, the lubricant bases concerned consisting of mineral oils and certain synthetic oils.

In addition, U.S. Pat. No. 4,204,969 describes a quite similar method for the preparation of olefin polysulfides that can be used as extreme pressure additive for lubricating oils; this method comprises the following principal steps:

(1) Sulfur monochloride is reacted at 30°–100° C. with a $C_3$ to $C_6$ aliphatic mono-olefin (in general isobutene) preferably in the presence of a promoter consisting of a lower alcohol, in order to form an adduct;

(2) This adduct is reacted with sulfur or sodium sulfide (prepared for example from NaOH, NaHS and/or $H_2S$) in a ratio of 0.1 to 0.4 gram-atom of sulfur per mole of sodium sulfide in an aqueous alcoholic medium at a temperature ranging from 50° C. to the reflux temperature; and the product obtained is recovered without treatment by means of a base.

It is indicated in the unique example that the product prepared has a sulfur content of 49% by weight and a viscosity at 37.8° C. (100° F.) of 8.6 mm$^2$/s (cSt). When it is desired, using the methods described in the previous art, to increase the sulfur content of the additives by using a greater proportion of elemental sulfur, with respect to the alkali sulfide or hydrosulfide used, products are obtained which are no longer sufficiently soluble in synthetic lubricating oils (for example, in those of the polyalphaolefin type) or even in mineral lubricating oils, to be usable as extreme pressure additives. In addition, the kinematic viscosity of the products thereby obtained is in general too high.

SUMMARY OF THE INVENTION

This invention provides a new method for the preparation of products which do not have the drawbacks stated above, while using a greater proportion of elemental sulfur.

Another advantage of the method according to the invention is that it allows, if it is so desired, for example for economic reasons, to reduce in the second step the duration of the time needed for the introduction of the olefin+sulfur chloride addition product obtained in the first step into the reaction medium containing the sulfur reagents (alkali sulfide or hydrosulfide and, in most cases, elemental sulfur), without giving products whose kinematic viscosity would be too high and, in addition, which would be insoluble in synthetic oils (for example, in those of the polyalphaolefin type) or even in mineral oils, as would be the case with the methods of the prior art.

The annexed FIGURE gives a flowchart showing the continuous operation of a part of the steps of the method according to the invention.

In general, the method for the preparation of olefin polysulfides of the invention comprises the following steps:

(1) At least one compound selected from sulfur monochloride and dichloride is reacted for example at a temperature of 20° to 80° C. with at least one aliphatic mono-olefin containing 2 to 5 carbon atoms, thereby forming an addition product (or adduct);

(2) Said adduct and at least one hydrocarbyl halide, which will be described later, are brought into contact with at least one sulfur compound selected from sulfides, hydrosulfides and polysulfides of alkali metals, ammonium or alkaline-earth metals and usually elemental sulfur, in an aqueous or aqueous alcoholic medium, and maintained, for example, at a temperature of 20° to 100° C. during the introduction of the various reagents;

(3) The resulting mixture is heated at a temperture for example from 50° C. to the reflux temperature and allowed to settle, the lower, aqueous phase is then discarded and the olefin polysulfide recovered from the upper, organic phase; and (4) if necessary, the product obtained is treated with a basic compound, such as an inorganic base.

In the method according to the invention, the starting olefins can contain 2 to 5 carbon atoms, and be used alone or in mixtures. Isobutylene is used most commonly. Such olefins can also be used mixed with minor proportions of olefins containing more than 5 carbon atoms (for example diisobutylene).

An olefin can be used in a proportion of 1.5 to 2.5 moles, preferably from 1.8 to 2.2 moles, per mole of sulfur monochloride and/or dichloride. It is generally introduced into the liquid sulfur monochloride and/or dichloride at a temperature of 20° to 80° C., or more specifically, between 30° and 50° C.

In step (2) of the method according to the invention, the hydrocarbyl halide used conjointly with the "adduct" obtained on completion of step (1) can consist of a $C_1$ to $C_{12}$ (preferably $C_1$ to $C_8$) alkyl, $C_5$ to $C_{12}$ (preferably $C_6$) cycloalkyl or a $C_6$ to $C_{12}$ (preferably $C_7$ and $C_8$) arylalkyl chloride, bromide or iodide. Said cycloalkyl arylalkyl halides may be substituted. For practical reasons it is considered to be particularly advantageous to use hydrocarbyl halides whose boiling point for example is up to 100°–150° C. The hydrocarbyl halide used is essentially a monohalide.

As examples can be cited in particular methyl ethyl, isopropyl, n-propyl, tert-butyl, isobutyl, n-butyl, tert-amyl, isoamyl, n-amyl, n-hexyl, 2-ethylhexyl, n-octyl, cyclohexyl and benzyl chlorides, bromides and iodides and their mixtures. Isopropyl chloride, n-butyl chloride and bromide, n-octyl chloride, cyclohexyl chloride or benzyl chloride may be advantageously used.

The proportion of hydrocarbyl halide must be sufficient for a marked improvement of the properties of the end product to be observed. It is generally from 1 to 70% in gram-atoms of halogen with respect to the total number of gram-atoms of the halogen of the adduct-+hydrocarbyl halide aggregate. This proportion in general corresponds to about 0.015 to 1.9 moles of hydrocarbyl halide per 100 g of adduct, in particular, when the starting mono-olefin is isobutylene.

Within the scope of this invention, it is possible to replace at least a portion of the hydrocarbyl monohalide, such as is defined above, by at least one monohalogenated hydrocarbon further containing at least one functional group comprising one or several heteroatoms (such as oxygen and/or nitrogen and/or sulfur).

Of the functional monohalogenated hydrocarbon compounds, the monochloro- and monobromo-compounds are used principally. They are advantageously selected from:

monohalogenated compounds containing at least one alcohol function and in particular:
halides of aliphatic, alicyclic or aromatic-aliphatic monoalcohols containing for example 2 to 18 carbon atoms, such as for example, 2-chloro- and 2-bromo-ethanols, chloro- and bromo-propanols, butanols, pentanols, hexanols, heptanols, octanols, nonanols, decanols, undecanols and dodecanols, and chloro- or bromo-benzyl alcohols, and chloro- or bromo-phenylethyl alcohols;
halides of polyols, such as for example, 3-chloro- or 3-bromopropane 1,2-diol (and the corresponding epoxy derivatives; for example 1-chloro- or 1-bromo-2,3-epoxy propane);
halides of (poly)oxyalkylene monoalcohols; such as for example chloro- and bromo-(poly-)ethoxyethanols, (poly-)ethoxypropanols, (poly-)propoxyethanols and (poly-)propoxy-propanols;
monohalogenated compounds containing at least one phenol function, such as for example, chloro- and bromo-phenols, non-substituted or substituted for example by alkyl groups;
monohalogenated compounds containing at least one carboxylic function such as for example chloro- and bromo-acetic, propionic, butyric, valeric, benzoic and succinic acids;
monohalogenated compounds containing at least one amine function, in particular aliphatic, alicyclic or aromatic-aliphatic compounds, such as for example, chloroethylamine hydrochloride, and chloro-N,N-dimethyl-, diethyl-, and dipropyl-ethylamine hydrochlorides, chloro- and bromo-benzylamines and chloro- and bromo-phenylethylamines;
monohalogenated compounds containing at least one amide function, such as for example, chloro- and bromo-acetamides and proprionamides;
or
monohalogenated compounds containing at least one thiol function, such as for example, chloro- and bromo-mercaptothiazoles, chloro- and bromo-phenylmercaptans and chloro- and bromo-benzyl mercaptans.

Among the functional monohalogenated compounds which have groups of different types are:
compounds with hydroxyl and carboxylic acid functions, such as for example 5-chloro-salicylic acid or 3-chloro-4-hydroxy mandelic acid;
compounds with amine and carboxylic acid functions, such as for example 4-chlorophenylalanine, or;
compounds with hydroxyl and amine functions.

Without departing from the scope of the invention, these mono-halogenated hydrocarbon compounds can be used conjointly with non-functional hydrocarbyl halides, such as are described above, in any proportion.

In the following the terms (mono-)hydrocarbyl halides and monohalogenated hydrocarbons will be used interchangeably to designate the nonfunctional compounds and the functional compounds used, or their mixtures.

When in step (2) of the method according to the invention, use is made of the functional monohalogenated compound, such as is described above, it is advantageous to carry out the reaction of this step in the presence of a small quantity (for example 0.1 to 10% by weight) of at least one phase transfer catalyst in particular a quarternary ammonium chloride (for example, tetrabutylammonium chloride) or an alkylphosphonium halide or else a cryptate.

The sulfur compound used in step (2) may be selected from sulfides, hydrosulfides and polysulfides of alkali metals (for example sodium or potassium), alkaline-earth metals (for example magnesium or calcium) or ammonium. Sodium sulfide, sodium hydrosulfide (for example in the presence of caustic soda) and sodium polysulfides are most commonly used. The proportion of this compound used in this method with respect to the whole adduct (such as is obtained on completion of step (1))+the hydrocarbyl halide (as described above), is about 0.4 to 0.8 moles of sulfur compound per gram-atom of halogen contained in the adduct+hydrocarbyl halide aggregate.

The molar ratio of elemental sulfur to sulfur compound, if the former has been used in step (2) conjointly with the sulfur compound, can be up to about 7/1, which corresponds to an inverse ratio which can be as low as about 0.14/1.

When it is desired that the sulfur content of the final product should not be too high (up to about 45 to 55% by weight) a molar ratio of elemental sulfur to sulfur compound of, for example, up to about 4/1 is used, this ratio being in this case usually about 0.4/1 to 3.3/1. The inverse ratio is then at least about 0.25/1, usually about 0.3/1 to 2.5/1. In this case, it is not necessary for the proportion of the monohalogenated hydrocarbon used to be very high; a proportion of 1 to 40% (calculated in gram-atoms of halogen with respect to the total number of gram-atoms of halogen of the aggregate formed by the "adduct" and the monohalogenated hydrocarbon) is generally appropriate. This proportion corresponds to about 0.015–0.55 gram-atom of halogen per 100 g of "adduct", in particular when the starting mono-olefin is isobutylene.

One then obtains olefin polysulfides which can have a sulfur content generally of up to about 45–55% by weight and sometimes a little more (about 60% by weight). Their kinematic viscosity at 100° C. varies in accordance with their sulfur content) and can be about 4 to 20 mm$^2$/s. Their halogen content (mainly chlorine) is generally less than 1% by weight, usually 0.6% by weight.

These products are generally soluble in substantial concentrations in mineral oils and most synthetic oils and some products are soluble in the same at all concentrations. The products which have the highest sulfur contents may have a more limited solubility in lubricating oils, this solubility however being sufficient for some of the applications for which they may be intended (additives for cutting oils in metal work, for example).

When it is desired to have higher sulfur contents in the final product (about 60 to 65% by weight), a molar ratio of elementary sulfur to sulfur compound of, for example, up to 7/1, more particularly, 3.3/1 to 7/1, can be used (the inverse ratio can then be as low as about 0.14/1, more particularly, between 0.14/1 to 0.3/1). A higher proportion of monohalogenated hydrocarbon is then used, for example, 40 to 70% (expressed in gram-atoms of halogen with respect to the total number of gram-atoms of halogen of the aggregate formed by the "adduct" and the monohalogenated hydrocarbon), more particularly, about 45 to 65%. These proportions correspond to about 0.55–1.9 gram-atoms of halogen (more particularly about 0.7–1.5 gram-atoms of halogen) per 100 g of "adduct", in particular when the starting mono-olefin is isobutylene.

It is then possible to obtain products which, although they have a very high sulfur content (about 60 to 65% by weight for a chlorine content of less than 1% by weight), have a low viscosity (viscosity at 100° C. of 4 to 15 mm$^2$/s) and are still soluble in low viscosity mineral oils used in metal work (for cutting, forming), at concentrations sufficient to improve the extreme pressure properties of such oils.

In step (2), the sulfur compound is generally introduced (or formed) and any elemental sulfur is introduced into the water or, preferably, into a mixture of water and a lower aliphatic monoalcohol (containing for example 1 to 4 carbon atoms).

Lower aliphatic monoalcohols can include: methanol, ethanol, propanol, isopropanol, n-butanol, isobutanol and tert-butanol. Isopropanol is preferred. The water-alcohol mixture used can contain for example 2 to 60% by weight of alcohol (preferably 5 to 45%) with respect to the weight of the water.

Into the medium thereby obtained, maintained under agitation (at 20°–100° C.) the addition product from step (1) and the hydrocarbonyl halide are added conjointly, this taking a few minutes to several hours, for example 10 minutes to 3 hours.

In step (3), heating is continued for example for 3 to 10 hours (at a temperature of between 50° C. and the reflux temperature).

If necessary, a step (4) can be introduced consisting essentially of treating the product obtained on completion of step (3) by means of a basic compound which, for example, can be an inorganic base, such as caustic soda or caustic potash in aqueous solution. The concentrations of caustic soda and caustic potash in aqueous solutions used can be, for example, 0.5 to 20% by weight.

The reaction in step (2) of the method according to the invention and the subsequent treatments can be carried out continuously. The operations are performed preferably according to a parallel flow and multiple-contact (rather than counter-current) feed procedure, which is favorable for the properties of the products finally obtained.

Figure 1:
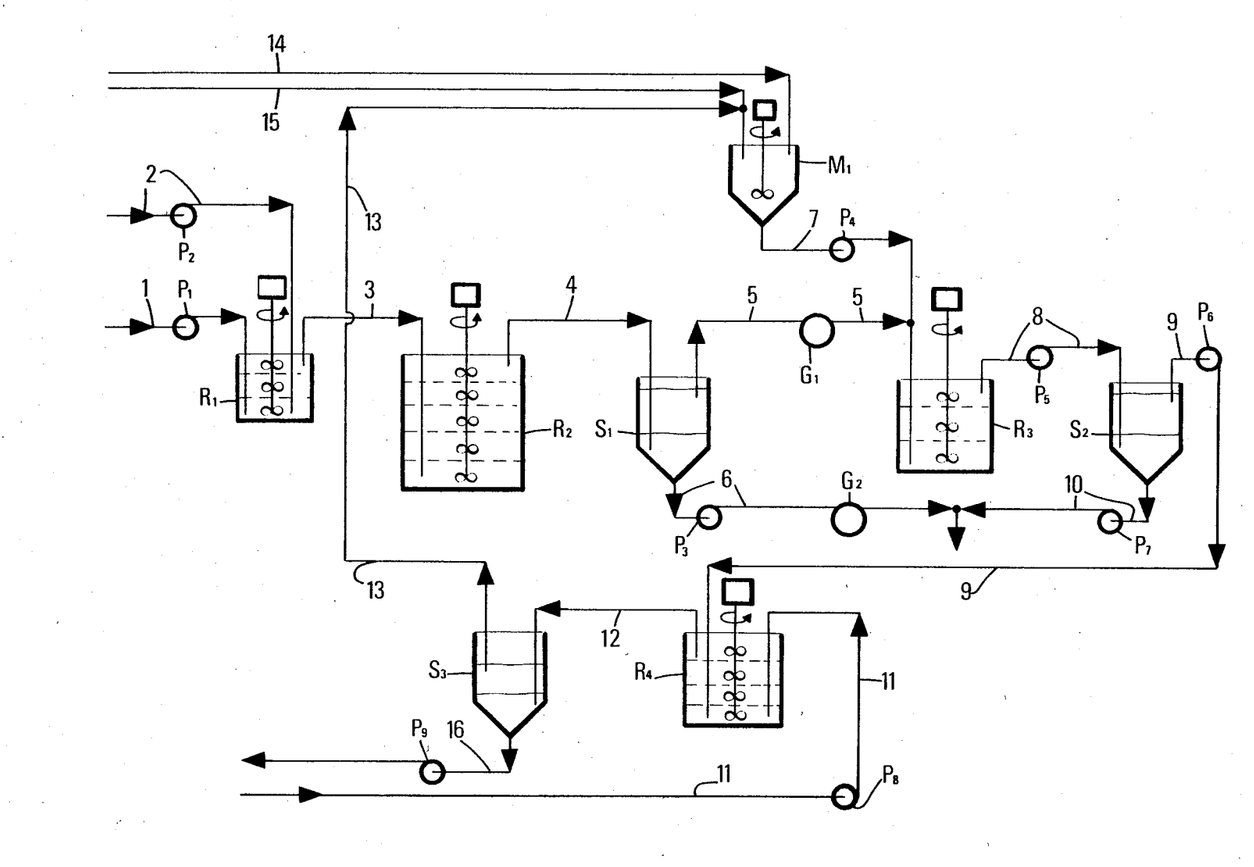

The operation can be carried out under a slight overpressure (the absolute pressure can be of up to about 3 bars=0.3 MPa), which enables the reaction temperatures and reaction rates to be raised without affecting the properties of the final products. Such a mode of embodiment is described in more detail in Example 43, in relation to the FIGURE.

The products obtained by the method according to the invention can be used advantageously as extreme pressure additives for lubricating oils.

A first application concerns more particularly the formulation of oils intended for lubricating gears.

The basic oils can be of mineral or synthetic origin. Synthetic oils include in particular olefin oligomers such as tri-, tetra- and pentamers of 1-decene obtained by oligomerization in the presence of a Lewis acid. Other α-olefins can naturally be used, for example, C$_6$ to C$_{14}$ α-olefins.

Alkylbenzenes, such as mono- and dialkylbenzens can also be used, or synthetic esters derived from mono- or polycarboxylic acids (such as sebacic acid, fatty acids, etc.), and monoalcohols or polyols (such as 2-ethyl hexanol, trimethylol-propane, etc.).

For this application olefin polysulfides can be used whose preparation involves both relatively low proportions of sulfur (molar ratios of sulfur compound/elemental sulfur of, for example, 1.8/1 to 2.5/1) and high proportions of sulfur. For reasons of solubility in the lubricant chosen, the value of the sulfur compound/elemental sulfur molar ratio can be as low as about 0.4/1 for additives that can be used in mineral oils, and as low as 1.5/1 (or less), for additives that can be used in synthetic oils.

The olefin polysulfides considered can then be added to the lubricating oils at concentrations ranging for example from 0.5 to 7%.

These additives can be used in combination with phosphorus additives, such as metal dialkyl- or diaryldithiophosphates, phosphites and organic phosphates.

Other conventional additives can be added, such as anti-oxidants, rust inhibitors, copper passivators, antifoaming agents, friction reducers, in the usual proportions.

A second application of the products prepared according to the invention as extreme pressure additives for lubricants concerns more particularly the formulation of oils intended for use in metal work (cutting, forming, etc.).

This application is particularly advantageous with the products whose preparation involves the use of the lowest sulfur compound/elemental sulfur molar ratios, for example, 0.14/1 to 0.3/1, these products (very rich in sulfur) being surprisingly still sufficiently soluble in mineral origin base oils to be used in the formulation of lubricants in metal work (for example, 100 Neutral Solvent).

In this application, the concentration of the additive used is generally 0.1 to 10%, and preferably, 0.5 to 5% by weight with respect to the lubricating oil. In this application, other classic additives can be added, such as chlorinated paraffins in a proportion corresponding, for example, to 2–10% by weight of chlorine with respect to the lubricating oil.

The following examples illustrate the invention without limiting it.

Examples 1, 2, 5, 7, 10, 12, 22, 24 and 27 are given for comparison purposes.

EXAMPLE 1 (COMPARATIVE)

Into a 10 l reactor heated to 40°–45° C. were introduced 3800 g of sulfide monochloride $S_2Cl_2$ (28.14 moles), and then, through a plunger tube under the surface of the constantly agitated $S_2Cl_2$, 3650 g of isobutene (68.54 moles), in which had been dissolved 35.6 g of methanol. The temperature of the reaction medium was maintained at between 45° and 50° C. throughout the duration of the introduction of the isobutene (3 hours). In this way 7040 g of addition product, designated by the term "adduct" were obtained.

Into a second 1 l reactor were introduced successively 296 g of water, 159.3 g of 60% of $Na_2S$ flakes (1.225 mole), 19.5 g of finely divided sulfur (0.609 atom-g) and 31 cm$^3$ of isopropanol (the $Na_2S/S$ molar ratio used in this test was 2). The mixture was heated at 80° C., while agitating, for one hour and the temperature then reduced to 45° C.

Into the constantly agitated aqueous medium were introduced 250 g of the previously obtained addition product, the introduction taking 0.75 hour. The temperature of the reaction medium rose gradually from 45° to 75° C.; the mixture was then heated under total reflux (88°–95° C.) for 6 hours, accompanied by vigorous agitation.

After settling, the lower aqueous phase was discarded and 200 cm$^3$ of a 10% by weight solution of caustic soda added to the organic phase. The mixture was then heated again under reflux for 6 hours.

The organic phase recovered after settling was washed three times with 200 cm$^3$ of water; it was then dried under a vacuum of 2666 Pa at 100° C. for one hour and then filtered in the presence of diatomaceous earth. In this way were obtained 189 g of an orange-yellow liquid whose characteristics were the following:

S (% weight)=46.2
Cl (% weight)=0.37
Viscosity at 100° C. (mm$^2$/s)=12.0

EXAMPLE 2 (COMPARATIVE)

Operating under conditions rigorously identical with those of Example 1, 250 g of the isobutene/$S_2Cl_2$ addition product were introduced into the alkaline polysulfide aqueous solution over 0.2 hour. After reaction and treatment (applied as described in Example 1), 192.5 g of a viscous, orange-yellow viscous product were obtained whose characteristics were the following:

S (% weight)=45.4
Cl (% weight)=1.17
Viscosity at 100° C. (mm$^2$/s)=30.0

EXAMPLE 3

Operating under conditions rigorously identical with those described in Example 1, 296 g of water, 159.3 g of 60% of $Na_2S$, 15.9 g of sulfur and 31 cm$^3$ of isopropanol were introduced successively (as before, the $Na_2S/S$ molar ratio was 2).

Into the constantly agitated aqueous medium was then introduced a mixture consisting of 225 g of $S_2Cl_2$/isobutene addition product of Example 1 and 18.72 g of n-butyl chloride (0.202 mole) over 0.2 hour. After reaction followed by treatment with caustic soda, washing with water, drying and filtering, 182.1 g of an orange-yellow liquid were obtained whose characteristics were as follows:

S (% weight)=45.7
Cl (% weight)=1.08
Viscosity at 100° C. (mm$^2$/s)=14.1

EXAMPLE 4

The experiment under Example 3 was performed under the same conditions regarding introduction time and $Na_2S$, sulfur and isopropanol concentrations ($Na_2S/S$ molar ratio of 2), using this time a mixture consisting of 200 g of addition product of Example 1 and 37.45 g of n-butyl chloride (0.405 mole). After treatments, 181.6 g of an orange-yellow liquid were otained whose characteristics were the following:

S (% weight)=45.0
Cl (% weight)=0.68
Viscosity at 100° C. (mm$^2$/s)=5.7

EXAMPLE 5 (COMPARATIVE)

Operating under the same conditions as those stated in Example 1, 22.4 g of sulfur were used (in this test the $Na_2S/S$ molar ratio was then 1.75). 250 g of isobutene/$S_2Cl_2$ addition product were then introduced into the aqueous solution of alkaline polysulfide over 2 hours. After reaction and then treatment with caustic soda, washing with water, drying and filtering, 192 g of a viscous orange-yellow liquid were obtained whose characteristics were the following:

S (% weight)=47.1
Cl (% weight)=0.92
Viscosity at 100° C. (mm$^2$/s)=19.2

EXAMPLE 6

The experiment was carried out under the same conditions as regards introduction time and $Na_2S$, sulfur and isopropanol concentrations ($Na_2S/S$ molar ratio of 1.75), using this time a mixture consisting of 200 g of the addition product of Example 1 and 37.45 g of n-butyl chloride (0.405 mole). After treatments 190 g of an orange-yellow liquid were obtained whose characteristics were the following:

S (% weight)=45.8
Cl (% weight)=0.6
Viscosity at 100° C. (mm$^2$/s)=4.7

EXAMPLE 7 (COMPARATIVE)

Operating under the same conditions as those of Example 1, 26 g of sulfur (in this test the $Na_2S/S$ molar ratio was then 1.5). After reaction and treatments, 195 g of a very viscous, yellow-orange product were obtained whose characteristics were the following:

S (% weight)=45.2
Cl (% weight)=1.34
Viscosity at 100° C. (mm$^2$/s)=35.5

EXAMPLE 8

The experiment of Example 7 was repeated under the same operating conditions, using this time a mixture consisting of 237.5 g of isobutene/$S_2Cl_2$ addition product and 9.4 g of n-butyl chloride (0.102 mole). After reaction and treatments, 187 g of an orange-yellow product were obtained whose characteristics were the following:

S (% weight)=46.8
Cl (% weight)=0.95

Viscosity at 100° C. (mm$^2$/s) = 14.7

EXAMPLE 9

The experiment of Example 7 was repeated under the same operating conditions, using this time a mixture consisting of 200 g of S$_2$Cl$_2$/isobutene addition product and 37.45 g of n-butyl chloride (0.405 mole). 170 g of a fluid product were obtained whose characteristics were the following:

S (% weight) = 46.4
Cl (% weight) = 0.60
Viscosity at 100° C. (mm$^2$/s) = 4.2

EXAMPLE 10 (COMPARATIVE)

The experiment of Example 1 was repeated using 78.4 g of sulfur (in this test the Na$_2$S/S molar ratio was 0.5). After reaction of the 250 g of isobutene/S$_2$Cl$_2$ addition product, then treatments, 212 g of a very viscous, orange-yellow product were obtained whose characteristics were the following:

S (% weight) = 44.7
Cl (% weight) = 1.54
Viscosity at 100° C. (mm$^2$/s) = 39.8

EXAMPLE 11

The experiment of Example 10 was repeated under the same operating conditions using a mixture consisting of 200 g of isobutene/S$_2$Cl$_2$ addition product and 37.45 g of butyl chloride (0.405 mole). After reaction and treatments, 202 g of product were obtained whose characteristics were the following:

S (% weight) = 48.1
Cl (% weight) = 0.44
Viscosity at 100° C. (mm$^2$/s) = 9.6

EXAMPLE 12 (COMPARATIVE)

Into the 1 l reactor were introduced successively: 296 g of water, 159.3 g of 60% Na$_2$S, 98 g of sulfur (the Na$_2$S/S molar ratio used in this example was then 0.4). After heating at 80° C. for one hour and then cooling to 45° C., 250 g of the addition product of Example 1 were added over 1.5 hour. After refluxing for 8 hours, the organic phase was separated and treated as in Example 1. 230 g of a very viscous product were obtained whose characteristics were the following:

S (% weight) = 46.2
Cl (% weight) = 2.43
Viscosity at 100° C. (mm$^2$/s) = 47.5

EXAMPLE 13

The experiment of Example 12 was repeated using a mixture consisting of 187.5 g of adduct and 47.4 g of n-butyl chloride (0.512 mole). After reaction and treatments, 225 g of a product were obtained whose characteristics were the following:

S (% weight) = 52.2
Cl (% weight) = 0.74
Viscosity at 100° C. (mm$^2$/s) = 14.2

EXAMPLE 14

The experiment was performed under the same conditions as those in Example 13, using 120.8 g of sulfur (the Na$_2$S/S molar ratio was 0.32 in this example) and a mixture of 187.5 g of isobutene/S$_2$Cl$_2$ addition product and 47.4 g of n-butyl chloride (0.512 mole). After reaction and treatments, 253 g of product were obtained whose characteristics were the following:

S (% weight) = 58.6
Cl (% weight) = 0.61
Viscosity at 100° C. (mm$^2$/s) = 18.7

The characteristics of the products of Example 1 to 14 are given in Table I.

In particular, the solubility tests for which the results are given were performed by incorporating the products of Examples 1 to 14 at a concentration of 5% by weight in lubricating oils of viscosity grade SAE 90, one being a solvent-refined mineral oil, the other an oil of synthetic origin (polyalphaolefin PAO).

TABLE I

| | OPERATING CONDITIONS | | | | PRODUCT CHARACTERISTICS | | | SOLUBILITY at 5% BY WEIGHT IN SAE 90 | | | |
|---|---|---|---|---|---|---|---|---|---|---|---|
| | | n-butyl | Duration introduction | | Viscosity | | | Mineral | | P.A.O. | |
| Example | Adduct (g) | chloride (g) | of n-butyl + adduct (h) | Na$_2$S/S (molar) | 100° C. (mm$^2$/s) | S (% weight) | Cl (% weight) | 20° C. | −5° C. | 20° C. | −5° C. |
| 1* | 250 | 0 | 0.75 | 2 | 12.0 | 46.2 | 0.37 | sol | sol | insol | insol |
| 2* | 250 | 0 | 0.2 | 2 | 30.0 | 45.4 | 1.17 | insol | insol | insol | insol |
| 3 | 225 | 18.72 | 0.2 | 2 | 14.1 | 45.7 | 1.08 | sol | sol | insol | insol |
| 4 | 200 | 37.45 | 0.2 | 2 | 5.7 | 45.0 | 0.68 | sol | sol | sol | sol |
| 5* | 250 | 0 | 2 | 1.75 | 19.2 | 47.1 | 0.92 | insol | insol | insol | insol |
| 6 | 200 | 37.45 | 2 | 1.75 | 4.7 | 45.8 | 0.6 | sol | sol | sol | sol |
| 7* | 250 | 0 | 0.75 | 1.5 | 35.5 | 45.2 | 1.34 | insol | insol | insol | insol |
| 8 | 237.5 | 9.4 | 0.75 | 1.5 | 14.7 | 46.8 | 0.95 | sol | sol | insol | insol |
| 9 | 200 | 37.45 | 0.75 | 1.5 | 4.2 | 46.4 | 0.60 | sol | sol | sol | sol |
| 10* | 250 | 0 | 0.75 | 0.5 | 39.8 | 44.7 | 1.54 | insol | insol | insol | insol |
| 11 | 200 | 37.45 | 0.75 | 0.5 | 9.6 | 48.1 | 0.44 | sol | sol | insol | insol |
| 12* | 250 | 0 | 1.5 | 0.4 | 47.5 | 46.2 | 2.43 | insol | insol | insol | insol |
| 13 | 187.5 | 47.4 | 1.5 | 0.4 | 14.2 | 52.2 | 0.74 | sol | sol | insol | insol |
| 14** | 187.5 | 47.4 | 1.5 | 0.32 | 18.7 | 58.6 | 0.61 | insol | insol | insol | insol |

*Comparative examples
**Additive of Example 14 is nevertheless soluble at a concentration of 1% by weight in 100 Neutral Solvent This concentration of 5% was close to that generally used in the formulation of motorcar gear oils. The determinations were made at 20° C. and after storage in a cold chamber at −5° C. In these tests the products which were only partially soluble at the concentration considered were declared to be insoluble.

EXAMPLE 15

The experiment of Example 4 was repeated introducing into the sodium polysulfide solution a mixture of 200 g of isobutene/S$_2$Cl$_2$ addition product and 37.45 g of n-butyl chloride (0.405 mole) over 0.75 hour. (Na$_2$S/S molar ratio = 2). After reaction and treatments, 187 g of product were obtained whose characteristics are the following:

S (% weight) = 45.6
Cl (% weight) = 0.51

Viscosity at 100° C. (mm²/s) = 5.3

EXAMPLE 16

The experiment of Example 15 was repeated substituting the 37.45 g of n-butyl chloride (0.405 mole) by the same molar quantity of n-butyl bromide (55.44 g). After the reaction and treatments under identical conditions, 185 g of product were obtained whose characteristics were the following (X represents the sum of chlorine + bromine):

S (% weight) = 45.4
X (% weight) = 0.68
Viscosity at 100° C. (mm²/s) = 5.5

EXAMPLE 17

The experiment of Example 15 was repeated substituting the 37.45 g of n-butyl chloride by the same molar quantity of cyclohexyl chloride (47.98 g). After reaction and treatments, 187 g of product were obtained whose characteristics were the following:

S (% weight) = 45.2
Cl (% weight) = 0.54
Viscosity at 100° C. (mm²/s) = 4.5

EXAMPLE 18

The experiment of Example 15 was repeated substituting the 37.45 g of n-butyl chloride by the same molar quantity of benzyl chloride (51.21 g). After reaction and treatments, 189 g of product were obtained whose characteristics were the following:

S (% weight) = 45.3
Cl (% weight) = 0.72
Viscosity at 100° C. (mm²/s) = 4.7

EXAMPLE 19

The experiment of Example 15 was repeated substituting the 37.45 g of n-butyl chloride by the same molar quantity of n-octyl chloride (60.15 g). After reaction and treatments, 194 g of product were obtained whose characteristics were the following:

S (% weight) = 44.1
Cl (% weight) = 0.49
Viscosity at 100° C. (mm²/s) = 4.7

EXAMPLE 20

The experiment of Example 15 was repeated substituting the 37.45 g of n-butyl chloride by the same molar quantity of isopropyl chloride (31.77 g). After reaction and treatments, 179 g of product were obtained whose characteristics were the following:

S (% weight) = 45.9
Cl (% weight) = 0.53
Viscosity at 100° C. (mm²/s) = 5.7.

The characteristics of the products described in Examples 15 to 20 are given in Table II hereinafter. In particular, the solubility tests whose results are given were performed by incorporating the products of Examples 15 to 20 at a concentration of 5% by weight in a synthetic lubricating oil of the polyalphaolefin type of viscosity grade SAE 90 at −5° C.

In Table II, RX represents the hydrocarbyl halide used and X the halogen considered.

TABLE II

| | Operating characteristics | | | | Product characteristics | | | Solubility at 5% by weight in P.A.O. at −5° C. |
|---|---|---|---|---|---|---|---|---|
| Example | Adduct (g) | RX used (g) | Duration introduct. adduct + RX (h) | Na₂S/S (molar) | Viscosity 100° C. (mm²/s) | S (% weight) | X (% weight) | |
| 15 | 200 | 37.45[1] | 0.75 | 2 | 5.3 | 45.6 | 0.51 | sol |
| 16 | 200 | 55.49[2] | 0.75 | 2 | 5.5 | 45.4 | 0.68 | sol |
| 17 | 200 | 50.0[3] | 0.75 | 2 | 4.5 | 45.2 | 0.54 | sol |
| 18 | 200 | 51.2[4] | 0.75 | 2 | 4.7 | 45.3 | 0.72 | sol |
| 19 | 200 | 60.2[5] | 0.75 | 2 | 4.7 | 44.1 | 0.49 | sol |
| 20 | 200 | 31.8[6] | 0.75 | 2 | 5.7 | 45.9 | 0.53 | sol |

[1] RX = n-butyl chloride
[2] RX = n-butyl bromide
[3] RX = Cyclohexyl chloride
[4] RX = Benzyl chloride
[5] RX = n-octyl chloride
[6] RX = Isopropylchloride

EXAMPLE 21

Into a pressure-resistant stainless steel 1 l reactor provided with a double-wall for heating or cooling, a vigorous agitation (turbine type), a contrablade system, an internal temperature sensor, a pressure gauge, tubing connected to a metering feed pump under pressure, were introduced successively:

159.3 g of 60% Na₂S (1.225 mole), 19.5 g of sulfur (0.609 atom-g) 31 cm³ of isopropanol and 296 g of water (the Na₂S/S molar ratio used was 2).

By means of the metering feed pump were introduced into the constantly agitated aqueous solution of polysulfide a mixture consisting of 174.7 g of S₂Cl₂/isobutene addition product of Example 1, and 30.6 g of methyl chloride (about 0.61 mole) over 0.75 hour.

The mixture was heated for 8 hours at 105° C.; a gradual reduction in the pressure with time was observed. The reactor was cooled to ambient temperature and then, after opening the reactor, the aqueous phase was discarded.

The organic product obtained was treated for 6 hours at about 95° C., as in the previous examples, with a 10% by weight solution of caustic soda, washed with water, dried and then filtered.

155 g of an orange-yellow product were obtained whose characteristics were the following:

S (% weight) = 46.5
Cl (% weight) = 0.5
Viscosity at 100° C. (mm²/s) = 5.2
Solubility at 5% by weight at −5° C.
in mineral oil: soluble
in PAO: soluble.

EXAMPLE 22 (COMPARATIVE)

Into a 1 l reactor were introduced 145 g of sulfur dichloride SCl₂ (1.407 mole) and then, by means of a plunger tube, under the surface of the constantly agitated SCl$_2$, 178 g of isobutene (3.43 moles) in which has been dissolved 1.78 g of methanol. The reaction temperature was maintained between 45° and 50° C. over the whole of the period during which the isobutene was introduced (0.5 hour). 301.5 g of addition product were thereby obtained.

Into a second 1 liter reactor were introduced successively 296 g of water, 159.3 g of 60% Na$_2$S flakes (1.225 mole), 39.2 g of finely divided sulfur (1.225 atom-g) and 31 cm$^3$ of isopropanol (the Na$_2$S/S molar ratio used in this test was equal to 1). The mixture was heated for one hour at 80° C. and the temperature then reduced to 45° C.

Into the constantly agitated medium were than introduced 214.2 g of the previously obtained addition product, this introduction taking 0.5 hour. The reaction medium temperature gradually rose from 45° to 75° C.; the mixture was then heated under total reflux (88°–95° C.) for 6 hours while agitating vigorously. After settling, the lower, aqueous phase was discarded, and 200 cm$^3$ of a 10% by weight aqueous solution of caustic soda added to the organic phase. The mixture was refluexd for 6 hours.

The organic phase recovered after settling was washed three times with water, dried under a vacuum of 2666 Pa at 100° C. for 1 hour, and then filtered in the presence of diatomaceous earth. 180 g of a very viscous, orange-yellow product were obtained whose characteristics were the following:

S (% weight)=44.1
Cl (% weight)=1.59
Viscosity at 100° C. (mm$^2$/s)=47.3

EXAMPLE 23

Operating under conditions rigorously identical with those described in Example 22, a mixture consisting of 37.45 g of n-butyl chloride (0.405 mole) and 171.3 g of isobutene/SCl$_2$ addition product were introduced into the aqueous solution of sodium polysulfide (Na$_2$S/S=1 molar), the introduction operation taking 0.5 hour to complete. After treatments, 182 g of an orange-yellow fluid liquid were obtained whose characteristics were the following:

S (% weight)=45.8
Cl (% weight)=0.64
Viscosity at 100° C. (mm$^2$/s)=7.2

The characteristics of the products described in Examples 22 and 23 are given in Table III. As previously, the solubility tests were performed by incorporating the products of Examples 22 and 23 at a concentration of 5% by weight in SAE 90 lubricating oils (one mineral oil and one synthetic oil of the PAO type).

molar ratio was 2). The mixture was agitated for 5 min, 99 cm$^3$ of water added, then heated at 75° C.

To this aqueous solution of sodium polysulfide were added 250 g of isobutene/S$_2$Cl$_2$ addition product prepared in Example 1, the addition taking place over 2 hours at a temperature of 75° C. The mixture was then heated under reflux for 4 hours, after which the isopropanol was distilled at 90° C. under atmospheric pressure and then under a vacuum of 2666 Pa.

After settling, the organic phase was washed with 125 cm$^3$ of water and 100 cm$^3$ of benzene. It was then allowed to settle again and the organic phase washed with the same quantities of water and benzene as before. It was then heated under reflux for 0.5 hour, allowed to cool and settle. The organic phase recovered was evaporated under a vacuum of 2666 Pa at 100° C. to remove the benzene. After filtration in the presence of diatomaceous earth, 201.1 g of orange-yellow product was obtained whose characteristics were the following:

S (% weight)=48.6
Cl (% weight)=0.75
Viscosity at 100° C. (mm$^2$/s)=6.1

EXAMPLE 25

The experiment of Example 24 was repeated using a mixture consisting of 237.5 g of S$_2$Cl$_2$/isobutene addition product and 9.4 g of n-butyl chloride (0.102 mole). After reaction and treatments, 190 g of a fluid product were obtained whose characteristics were the following:

S (% weight)=47.4
Cl (% weight)=0.62
Viscosity at 100° C. (mm$^2$/s)=5.7

EXAMPLE 26

The experiment of Example 24 was repeated using a mixture consisting of 200 g of isobutene/S$_2$Cl$_2$ addition product and 37.45 g of n-butyl chloride (0.405 mole). After reaction and treatments, 176.1 g of product were obtained whose characteristics were the following:

S (% weight)=46.8
Cl (% weight)=0.59
Viscosity at 100° C. (mm$^2$/s)=4.3

EXAMPLE 27 (COMPARATIVE)

The experiment of Example 24 was repeated using 59.25 g of sulfur (in this test the NaHS/S molar ratio was 0.5). After the reaction of 250 g of isobutene/S$_2$Cl$_2$ addition product and treatments, 253 g of an orange-yellow product were obtained whose characteristics were the following:

S (% weight)=55.4

TABLE III

| Product of example | Characteristics of Products | | | Solubility at 5% by weight in SAE 90 | | | |
|---|---|---|---|---|---|---|---|
| | Viscosity 100° C. (mm$^2$/s) | S (% by weight) | Cl (% by weight) | Mineral | | P.A.O. | |
| | | | | 20° C. | −5° C. | 20° C. | −5° C. |
| 22* | 47.3 | 44.1 | 1.59 | insol. | insol. | insol. | insol. |
| 23 | 7.2 | 45.8 | 0.64 | sol. | sol. | sol. | sol. |

*Comparative example

EXAMPLE 24 (COMPARATIVE)

Into a 1 l reactor were introduced 162 g of a 32% by weight aqueous solution of NaHS, 74 g of a 50% aqueous solution of caustic soda, 79.65 g of isopropanol and 14.8 g of finely divided sulfur (in this test the NaHS/S Cl (% weight)=0.93
Viscosity at 100° C. (mm$^2$/s)=14.1

EXAMPLE 28

The experiment of Experiment 27 was repeated using a mixture consisting of 200 g of the S$_2$Cl$_2$/isobutene addition product and 37.45 g of n-butyl chloride (0.405 mole). After reaction and treatments, 214 g of product were obtained whose characteristics were the following:

S (% weight)=55.0
Cl (% weight)=0.54
Viscosity at 100° C. (mm$^2$/s)=8.0

The characteristics of the products described in Examples 24 to 28 are given in Table IV.

As before, the solubility tests were performed by incorporating, at a concentration of 5% by weight, the products of Examples 21 to 25 in SAE 90 oils (one mineral oil and one synthetic oil of the PAO type).

soluble at the minimum concentration of 5% by weight in SAE 90 mineral oil (at 20° C. and −5° C.). The characteristics of this product thereby obtained were the following:

S (% weight)=53.1
Cl (% weight)=0.54
Viscosity at 100° C. (mm$^2$/s)=8.92.

EXAMPLE 31

Measurement of the corrosivity of products according to the invention

Copper plate corrosion tests were carried out in accordance with Standard ASTM D-130 (NF M 07-015),

TABLE IV

| Product of Example | NaHS S (molar) | n-BuCl (g) | Addition product S$_2$Cl$_2$/isoC$_4'$ (g) | Characteristics of Product | | Viscosity 100° C. (mm$^2$/s) | Solubility at 5% by weight in SAE 90 | | | |
|---|---|---|---|---|---|---|---|---|---|---|
| | | | | | | | Mineral | | P.A.O. | |
| | | | | S (% weight) | Cl (% weight) | | 20° C. | −5° C. | 20° C. | −5° C. |
| 24* | 2 | 0 | 250 | 48.6 | 0.75 | 6.1 | sol | sol | insol | insol |
| 25 | 2 | 9.4 | 237.5 | 47.4 | 0.62 | 5.7 | sol | sol | sol | insol |
| 26 | 2 | 37.45 | 200 | 46.8 | 0.59 | 4.3 | sol | sol | sol | sol |
| 27* | 0.5 | 0 | 250 | 55.4 | 0.93 | 14.1 | insol | insol | insol | insol |
| 28 | 0.5 | 37.45 | 200 | 55.0 | 0.54 | 8.0 | sol | sol | insol | insol |

*Comparative example

EXAMPLE 29

Into a 1 l reactor were introduced successively 214.4 g of a 32% by weight aqueous solution of NaHS, 74 g of a 50% aqueous solution, 78.4 g of finely divided sulfur and 79.65 g of isopropanol (in this test the NaHS/S molar ratio was 0.5). The mixture was agitated for 5 minutes, 99 cm$^3$ of water added, followed by heating at 80° C. and cooling to 45° C.

Into the constantly agitated medium was introduced a mixture consisting of 200 g of isobutene/S$_5$Cl$_2$ addition product obtained in Example 1 and 37.45 g of n-butyl chloride (0.405 mole), the introduction duration being 0.75 hour. After 6 hours under reflux, followed by settling, the aqueous alcoholic phase was discarded and the organic phase treated with 200 cm$^3$ of 10% aqueous solution of caustic soda for 6 hours.

After settling, the organic phase was recovered, washed three times with 200 cm$^3$ of water, dried under a vacuum of 2666 Pa at 100° C. for 1 hour, and then filtered in the presence of diatomaceous earth. In this way, 197 g of an orange-yellow product were obtained and found to be soluble at the minimum concentration of 5% by weight in SAE 90 oil of mineral origin (at 20° C. and −5° C.). The characteristics of the product thereby obtained were the following:

S (% weight)=51.7
Cl (% weight)=0.47
Viscosity at 100° C. (mm$^2$/s)=9.27

EXAMPLE 30

The experiment of Example 11 was repeated using 159.3 g of 60% Na$_2$S flakes, 218 g of water, 78.4 g of finely divided sulfur and 79.65 g of isopropanol (in this test the Na$_2$S/S molar ratio was 0.5); the mixture was then heated at 75° C.

The experiments were continued under the operating conditions of Example 24 by introducing into the alkaline polysulfide solution thereby obtained a mixture consisting of 200 g of isobutene/S$_2$Cl$_2$ addition product and 37.45 g of n-butyl chloride (0.405 mole), the addition taking 2 hours. After reaction and treatments, 195 g of an orange-yellow product were obtained which was using an SAE 90 mineral oil containing 5% by weight of additive. Certain of the additives prepared in the preceding examples were tested.

The results obtained are given Table V. They are expressed by a rating including a number (from 1 to 4), this number being followed by a letter specifying the corrosion grade of the copper plate.

TABLE V

| Product of Example | S in additive (% weight) | 3 hours | |
|---|---|---|---|
| | | 100° C. | 121° C. |
| 4 | 45.0 | 1 a | 1 b |
| 8 | 46.8 | 2 a | 1 b |
| 9 | 46.4 | 1 b | 2 a |
| 11 | 48.1 | 2 e | 3 b |
| 13 | 52.2 | 3 a | 4 a |
| 26 | 46.8 | 3 b | 3 c |
| 28 | 55.0 | 4 c | 4 c |

In order to formulate motorcar gear oils, products giving a rating of less than or equal to 3 (in particular at 121° C.) are to be used especially, such as the products of Examples 4,8,9 and 11. In addition, to formulate oils for use in metal work, any of the products prepared according to the invention can be used but preferentially those which give high corrosion ratings, such as those of Examples 13, 26 and 28, particularly for ferrous metals.

EXAMPLE 32

Evaluation of the properties of extreme pressure additives according to the invention Tests were carried out which revealed the extreme-pressure properties of the additives prepared in Examples 4, 9 and 11, in gear oil type formulations.

A—In a first series of tests, the products of Examples 4, 9 and 11 were investigated using a TIMKEN machine, according to a test procedure described in ASTM D 2782-71, at a concentration of 3% by weight in an SAE 90 mineral oil; the results obtained are given Table VI.

TABLE VI

| Additive of Example | Load (pounds*) "Pass" | Load (pounds*) "Fail" | Indent area (mm²) |
|---|---|---|---|
| without additive | 6 | 9 | 9.1 |
| 4 | 30 | 35 | 19.5 |
| 9 | 40 | 45 | 20.8 |
| 11 | 40 | 45 | 20.8 |

*1 Pound ≃ 0.4536 kgf

These results show that the utilization of the additives of the invention very definitely increase the seizing load of the lubricated metal surfaces.

B—In a second series of tests, the extreme pressure properties of these same additives were investigated, using a 4-ball machine, according to the procedures of ASTM D 2783 and ASTM D 2266, at a concentration of 1.5% by weight in SAE 90 oil; the results obtained are given in Table VII.

TABLE VII

| Additive of example | Load-wear index | Weld-load (kgf) | Diameter of ball indent - 1 h under 40 kgf (mm) |
|---|---|---|---|
| None | 22.2 | 60 | 0.80 |
| 4 | 64.4 | 400 | 0.64 |
| 9 | 62.9 | 400 | 0.61 |
| 11 | 65.6 | 500 | 0.69 |

These results show that the utilization of the additives of the invention is reflected by a very substantial increase in the load/wear index and the ball weld-load.

EXAMPLE 33

Into a 1 l reactor were introduced successively 296 g of water, 159.3 g of 60% Na₂S flakes (1.225 mole), 152.3 g of finely divided sulfur (4.75 gram-atoms) and 31 cm³ of isopropanol, the Na₂S/S molar ratio in this test being 0.258. The mixture was heated at 80° C., while agitating, for one hour, and the temperature then reduced to 45° C.

Into the constantly agitated aqueous medium was then introduced a mixture consisting of 125 g of addition product obtained as described in Example 1 (i.e. about 1.01 gram-atom of chlorine) and 93.4 g of n-butyl chloride (1.01 mole), the addition taking about 1.5 hour. The temperature of the reaction medium rose gradually from 45° to 75° C.; the mixture was then heated for 6 hours at 75° C. and then for 2 hours under total reflux (80°-85° C.) to complete the reaction.

After settling, the aqueous phase was discarded and 200 cm³ of a 4% by weight aqueous solution of caustic soda added to the organic phase. The mixture was refluxed again for 6 hours.

The organic phase recovered after settling was washed three times with 200 cm³ of water; it was then dried under a vacuum of 2666 Pa at 100° C. for one hour, and then filtered in the presence of diatomaceous earth. In this way 276 g of an orange-yellow liquid were obtained whose characteristics were the following:

S (% weight)=60.0
Cl (% weight)=0.86
Viscosity at 100° C. (mm²/s)=5.7

EXAMPLE 34

The experiment of Example 32 was repeated using 159.3 g of 60% Na₂S (1.225 mole), 163.4 g of sulfur (i.e. 5.096 gram-atoms), the Na₂S/S molar ratio in this test being 0.24, and a mixture consisting of 125 g of S₂Cl₂/isobutylene addition product and 93.4 g of n-butyl chloride (1.01 mole).

After treatments, 286.3 g of product were obtained whose characteristics were the following:

S (% weight)=61.7
Cl (% weight)=0.9
Viscosity at 100° C. (mm²/s)=6.2

EXAMPLE 35

The experiment of Example 33 was repeated using 159.3 g of 60% Na₂S (1.225 mole), 196.05 g of sulfur (i.e. 6.115 gram-atoms), the Na₂S/S molar ratio in this test being 0.2, and a mixture consisting 93.65 g of S₂Cl₂/isobutene addition product and 116.8 g of n-butyl chloride (1.263 mole).

After treatments, 252.7 g of product were obtained whose characteristics were the following:

S (% weight)=63.0
Cl (% weight)=0.54
Viscosity at 100° C. (mm²/s)=5.23

The solubility of the additives prepared as described in Examples 33, 34 and 35, was measured at two temperatures in two mineral oils of different composition:
100 Neutral Solvent mineral oil
Naphthenic spindle oil
The results obtained are given in the following table VIII.

TABLE VIII

| Additive of Example | Quantity of additive (% by weight) | Solubility after 15 days in: 100 Neutral solvent 20° C. | 100 Neutral solvent -5° C. | Naphthenic spindle 20° C. | Naphthenic spindle -5° C. |
|---|---|---|---|---|---|
| 33 | 2 | clear | cloudy | clear | clear |
| | 4 | clear | cloudy | clear | clear |
| | 7 | cloudy | turbid | clear | clear |
| | 10 | turbid | — | clear | clear |
| | 20 | — | — | clear | clear |
| 34 | 2 | clear | cloudy | clear | clear |
| | 4 | cloudy | cloudy | clear | clear |
| | 7 | cloudy | turbid | clear | clear |
| | 10 | turbid | — | clear | clear |
| | 20 | — | — | clear | clear |
| 35 | 2 | clear | turbid | clear | clear |
| | 4 | turbid | — | clear | clear |
| | 7 | — | — | clear | clear |
| | 10 | — | — | clear | clear |
| | 20 | — | — | clear | clear |

EXAMPLE 36

Evaluation of the extreme pressure properties of additives

Tests were performed to determine the extreme pressure properties of the additives prepared according to Examples 33, 34 and 35 in formulations of the cutting oil type for use in metal work by means of a 4-ball machine according to procedure ASTM D 2783.

The lubricating formulations investigated consisted of a 100 Neutral Solvent oil containing 3% chlorine in the form of chlorinated paraffin and 1% sulfur in the form of sulfur additives of Examples 33, 34 and 35. The results obtained are giving in the following Table IX.

TABLE IX

| Chlorinated paraffin % by weight | Additive of Example | S % weight of sulfur additive | % weight of additive in 100 NS oil | Solubility in 100 NS oil | | 4-ball tests | | |
|---|---|---|---|---|---|---|---|---|
| | | | | 20° C. | 0° C. | Load/wear Index | Load before seizing (Kgf) | Weld load (Kgf) |
| none | none | — | — | — | — | 21.4 | 50 | 126 |
| 4.62 | none | — | — | clear | clear | 38.1 | 80 | 200 |
| none | 33 | 60 | 1.67 | clear | cloudy | 42.8 | 80 | 315 |
| 4.62 | 33 | 60 | 1.67 | clear | clear | 93.8 | 100 | 620 |
| 4.62 | 34 | 61.7 | 1.62 | clear | clear | 97.2 | 100 | 620 |
| 4.62 | 35 | 63 | 1.59 | clear | clear | 101.0 | 100 | 620 |

These results show that the utilization of the additives according to the invention is reflected by a considerable increase in the ball well-load.

EXAMPLE 37

Into a 1 l reactor were introduced 159.3 g of 60% $Na_2S$ (1.225 mole), 22.4 g flowers of sulfur (0.7 gram-atom), 28.35 g of caustic soda pellets, 296 cm$^3$ of water and 3 g of tetrabutylammonium chloride (the $Na_2S/S$ molar ratio used in this test was 1.75). The mixture was heated at 80° C., while agitating, for one hour and the temperature then reduced to 45° C. This solution was transferred into a bromine funnel heated from the exterior so as to maintain its temperature at about 45° C.

Into a second 1 l reactor were introduced 162.5 g of the $S_2Cl_2$/isobutene addition product and 67 g of monochloroacetic acid (0.709 mole). The mixture was then heated at 50°–55° C., while agitating, to obtain homogenization.

By means of the heated bromine funnel, the hot solution of sodium polysulfide was gradually introduced over two hours into the chlorinated mixture, maintaining the reaction temperature of between 55° and 60° C.

The mixture was then heated under reflux (100°–103° C.) for 8 hours, the temperature then reduced to 75° C., 150 cm$^3$ of benzene added, agitation stopped and the reaction mixture allowed to settle.

The aqueous phase containing excess sodium polysulfide and the sodium salt of polythiodiglycolic acid formed was removed.

The organic phase was heated under reflux for three hours with 200 cm$^3$ of a 10% by weight solution of caustic soda, while agitating thoroughly. The temperature was then reduced to 75° C. and 10 g of NaCl added to facilitate settling; the aqeous phase was then discarded.

The organic phase recovered was treated, while agitating, with 120 cm$^3$ of an 6N aqueous solution of HCl for one hour at 70° C. It was then allowed to settle and the aqueous solution discarded; the organic phase was washed twice with 150 cm$^3$ of water and then dried over $Na_2SO_4$, filtered and then evaporated under vacuum (2.7×10$^3$ Pa at 100° C.).

In this way 125 g of an orange-yellow organic product was obtained whose acid number ($I_A$) corresponds to an equivalent molar mass of about 1650; in addition, the infra-red spectrum of the compound showed the presence of carbonyl groups.

The characteristics of the carboxylic sulfur compound thereby obtained were the following:

S (% weight)=40.1
Cl (% weight)=0.94
Viscosity at 100° C. (mm$^2$/s)=31.5
$I_A$=34.0

EXAMPLE 38

Into a 1 l reactor were introduced successively 159.3 g of 60% $Na_2S$, 22.4 g of sulfur, 296 g of water, 31 cm$^3$ of isopropyl alcohol and 3 g of tetrabutylammonium chloride. The mixture was heated for one hour at 80° C., while agitating, and then cooled to 45° C.

To this constantly agitated solution was added over a period of two hours a mixture consisting of 162.5 g of $S_2Cl_2$/isobutene addition product and 67 g of 1-chloro 2-propanol (0.709 mole), while maintaining the temperature of the aqueous mixture at about 79°–80° C. It was then heated under total reflux (90°–95° C.) for 8 hours.

Agitation was then stopped and the mixture allowed to settle at 75° C.; the aqueous phase containing excess sodium polysulfide and the polythiodipropyleneglycol formed was discarded.

The organic phase was treated under reflux (at about 95° C.) for three hours with a 200 cm$^3$ of a 10% by weight aqueous solution of caustic soda.

It was then allowed to cool to 75° C., 100 cm$^3$ of benzene added, agitation stopped, and allowed to settle.

The organic phase recovered was washed twice with 150 cm$^3$ of water, dried over $Na_2SO_4$, filtered and then evaporated at 100° C. under reduced pressure (2.7×10$^3$ Pa). In this way 130 g of a dark yellow organic product were obtained whose hydroxyl number ($I_{OH}$) corresponded to an equivalent molecular mass of 603; in addition, the infra-red spectrum of the compound showed the presence of hydroxyl groups.

The characteristics of this hydroxylsulfur compound obtained in this way were the following:

S (% weight)=40.7
Cl (% weight)=0.01
Viscosity at 100° C. (mm$^2$/s)=5.2
$I_{OH}$=93

EXAMPLE 39

The experiment of Example 38 was repeated using a mixture consisting of 162.5 g of $S_2Cl_2$/isobutene addition product and 57.1 g of 2-chloroethanol (0.709 mole).

After treatments, 134 g of a dark yellow organic product were obtained, having a hydroxyl number ($I_{OH}$) corresponding to an equivalent molar mass of about 1600; in addition, the infra-red spectrum of the compound showed the presence of hydroxyl groups.

The characteristics of the hydroxylated sulfur compound thereby obtained were as follows:

S (% weight)=41.6
Cl (% weight)=0.7
Viscosity at 100° C. (mm$^2$/s)=7.72
$I_{OH}$=35

EXAMPLE 40

Into a 1 l reactor were introduced 187.5 g of the $S_2Cl_2$/isobutene addition product and 65 g of 4-chlorophenol, and the mixture heated at 50°–55° C. to obtain homogenization.

By means of a bromine funnel heated from the exterior to maintain a temperature of 45° C. were introduced into the agitated reactor a solution consisting of 159.3 g of $Na_2S$, 22.4 g of sulfur, 31 $cm^3$ of isopropanol, 296 g of water and 3 g tetrabutylammonium chloride, while maintaining the reaction temperature between 50° and 60° C.

The mixture was then heated under reflux for 8 hours.

After settling and removal of the aqueous phase, the organic phase was treated with 200 $cm^3$ of 10% aqueous solution of caustic soda and then with 82 $cm^3$ of 6N HCl at 70° C. for 1 hour.

After settling, washings, drying, filtering and evaporation under reduced pressure, 126 g of a brownish-yellow organic product were obtained whose infra-red spectrum showed the presence of phenolic groups.

The characteristics of the phenolic sulfur compound thereby obtained were the following:
S (% weight)=38.2
Cl (% weight)=0.95
Viscosity at 100° C. ($mm^2/s$)=13.6
$I_{OH}$=23

EXAMPLE 41

The experiment of Example 38 was repeated using a mixture consisting of 200 g of $S_2Cl_2$/isobutene addition product, 18.5 g of n-butyl chloride and 53.6 g of 4-chloromethyl 2,6-ditertiobutyl phenol.

After heating under reflux for 8 hours (85°–90° C.), treatment with caustic soda, washing, drying and filtering, 200 g of an orange-yellow product were obtained whose infra-red spectrum showed the presence of hindered phenolic groups.

The characteristics of this phenolic sulfur compound were the following:
S (% weight)=37.4
Cl (% weight)=0.95
Viscosity at 100° C. ($mm^2/s$)=7.1

EXAMPLE 42

Into a 1 l reactor were introduced successively 144.8 g of 60% $Na_2S$, 20.4 g of sulfur, 222 $cm^3$ of water, 31 $cm^3$ of isopropanol and 3 g of tetrabutylammonium chloride. This mixture was heated at 80° C. for one hour, while agitating, and the temperature was then reduced to 45° C.

To this constantly agitated solution was then added in 2 hours a mixture consisting of 162.5 g of $S_2Cl_2$/isobutene addition product and 65.5 g of 1-chloro, 2,3-epoxy propane, while maintaining the reaction temperature between 50° and 55° C.

The mixture was then heated under reflux (94°–96° C.) for 15 hours after which 150 $cm^3$ of toluene were added. The heating and agitation were then stopped, and settling allowed to take place.

The organic phase was then treated under reflux for 3 hours with 200 $cm^3$ of a 10% caustic soda solution, washed twice with 200 $cm^3$ of water, dried over $Na_2SO_4$, filtered and evaporated at 100° C. under a vacuum of $2.7\times10^3$ Pa.

120 g of a dark, organic product were thereby obtained; its infra-red spectrum revealed the presence of hydroxyl groups.

The characteristics of this hydroxylated sulfur compound therby obtained were the following:
S (% weight)=41.4
Cl (% weight)=0.8
Viscosity at 100° C. ($mm^2/s$)=16.3
$I_{OH}$=76

EXAMPLE 43

In this example, the operations, using the same relative proportions as in Example 6, were continuous.

The description of this example refers to the annexed FIGURE.

A flow of 123 volumes/h of the halogenated mixture of $S_2Cl_2$/isobutene addition product and nBuCl (line 1, metering pump P1), and a flow of 248 volumes/h of aqueous alcoholic solution of sodium polysulfide (line 2, metering pump P2), pass simultaneously into the constantly agitated reactor R1 maintained at between 60° and 65° C. under an absolute pressure of 0.203 MPa.

After a mean residence time of 2 hours in R1, the 371 volumes/h of effluent flow pass by overflow (line 3) into reactor R2, which is constantly agitated and maintained at 105° C., under the same absolute pressure of 0.203 MPa.

After a mean residence time of 8 hours, the effluent flow passes by overflow line 4 to the separator S1, where the phase settling takes place at 80° C. in a mean time of 0.5 hour (absolute pressure 0.203 MPa). The flow of 371 volumes/h of the upper sulfur organic phase passes by line 5 into a pressure reducer G1 of the "GROVE BACK-PRESSURE" type, where its pressure is reduced from the required value (0.203 MPa) to atmospheric pressure, and it then passes to reactor R3.

The lower aqueous phase of the separator S1 is removed by line 6, metering pump P3 and pressure reducer G2 of the same type as G1.

Reactor R3, which is constantly agitated and maintained at 95°–100° C. (atmospheric pressure) is fed simultaneously by the flow of 371 volumes/h of organic sulfur phase (line 5) and by a flow of 116 volumes/h of 10% by weight caustic soda solution (line 7, metering pump P4). After a mean contact time of 6 hours, the 221 volumes/h of the mixture pass by overflow (line 8, metering pump P5) to separator S2, where the settling takes place in 0.5 hour at 60° C.

The 100 volumes/h of upper organic sulfur phase pass (line 9, metering pump P6) to reactor R4, while the flow of spent caustic soda is removed at the base of separator S2 (line 10, metering pump P7).

Reactor R4, which is constantly agitated, is fed simultaneously by the 100 volumes/h of organic sulfur phase from S2 and by a flow of 115 volumes/h of washing water (line 11, metering pump P8).

After a mean residence time of 0.5 hour at 60° C., the mixture passes by overflow by line 12 to settling tank S3, where the separation of phases takes place in 0.5 hour at 60° C.

The supernatant aquous phase passes by overflow (line 13) into mixer M1, where the 10% caustic soda solution is prepared, concentrated caustic soda being fed by line 14 and make-up water by line 15.

The flow of 100 volumes/h of the organic sulfur phase is collected at the base of separator S3 (line 16, metering pump P9) and passes to a thin film continuous evaporator ($2.7\times10^3$ Pa/100° C.), then to a filter and finally to storage.

The physical-chemical characteristics of the additive obtained were the following:
S (% weight)=46.1
Cl (% weight)=0.52
Viscosity at 100° C. ($mm^2/s$)=6.1

What is claimed is:

1. A method for the preparation of an olefin polysulfide, comprising the following steps:
   (1) reacting at least one compound chosen from sulfur monochloride or dichloride with at least one mono-olefin containing 2 to 5 carbon atoms, in a proportion of 1.5 to 2.5 moles of mono-olefin per mole of sulfur monochloride and/or dichloride, thereby forming an addition compound or adduct;
   (2) contacting said addition compound or adduct with at least one hydrocarbyl halide chosen from $C_1$ to $C_{12}$ alkyl, $C_5$ to $C_{12}$ cycloalkyl $C_6$ to $C_{12}$ arylalkyl chlorides, bromides and iodides, the proportion of said hydrocarbyl halide corresponding to 1–70% in gram-atoms of halogen with respect to the number of gram-atoms of halogen in the aggregate formed by said adduct and said hydrocarbyl halide, and with at least one sulfur compound selected from the sulfides, hydrosulfides and polysulfides of alkali metals, ammonium or alkaline-earth metals used in a proportion of about 0.4 to 0.8 mole per gram-atom of halogen contained in the aggregate formed by said adduct and said hydrocarbyl halide, and a proportion of elemental sulfur of 0 to 7 gram-atoms per mole of said sulfur compound, in an aqueous medium; and
   (3) heating the resultant mixture, separating it into an aqueous phase and an organic phase and recovering resultant olefin polysulfide from the organic phase.

2. A method according to claim 1, wherein in step (1), isobutene or a mixture of isobutene with a minor proportion of diisobutene is used as as the aliphatic mono-olefin.

3. A method according to claim 1 wherein said hydrocarbyl halide is a chloride, bromide or iodide of a methyl, ethyl, isopropyl, n-propyl, tert-butyl, isobutyl, n-butyl, tert-amyl, isoamyl, n-amyl, n-hexyl, 2-ethylhexyl, n-octyl, cyclohexyl or benzyl.

4. A method according to claim 1, wherein said hydrocarbyl halide is comprised at least partly of a monohalogenated hydrocarbon compound containing at least one alcohol, phenol, carboxylic acid, amine, amide or thiol functional group.

5. A method according to claim 1, wherein said sulfur compound is sodium sulfide, sodium hydrosulfide or a sodium polysulfide.

6. A method according to claim 1, wherein the proportion of elemental sulfur is 0.4/1 to 7/1 gram-atoms per mole of sulfur compound.

7. A method according to claim 1, wherein in step (1), said monoolefin is reacted with said compound at a temperature of 20° to 80° C., for a time sufficient to form said adduct; in step (2) said adduct and said hydrocarbyl halide are added to a medium containing said sulfur compound at a maintained temperature of 20° to 100° C. for a period of 10 minutes to three hours; in step (3), the mixture is heated to a temperature in the 50° C. to the reflux temperature range, for 3 to 10 hours.

8. A method according to claim 1, further comprising a step (4) in which the organic phase separated in step (3) is treated with a basic compound.

9. A method according to claim 1, wherein, from step (2), the operations are effected continuously, the reagents used in step (2) being brought into contact in a parallel flow and according to a multiple-contact method.

10. A method according to claim 1, wherein the proportion of hydrocarbyl halide used in step (2) is 2 to 40% in gram-atoms of halogen with respect to the number of gram-atoms of halogen of the aggregate formed by said adduct and said hydrocarbyl halide.

11. A method according to claim 10, wherein the proportion of elemental sulfur used in step (2) is 0.4/1 to 3.3./1 gram-atoms per mole of sulfur compound.

12. A method according to claim 1, wherein the proportion of hydrocarbyl halide used in step (2) is about 40 to 70% of in gram-atoms of halogen with respect to the number of gram-atoms of halogen in the aggregate formed by said adduct and said hydrocarbyl halide.

13. A method according to claim 12, wherein the proportion of elemental sulfur used in step (2) is 3.3./1 to 7/1 gram-atoms per mole of sulfur compound.

14. An olefin polysulfide obtained by a method according to claim 1.

15. An olefin polysulfide according to claim 14, having a sulfur content ranging up to about 45–65% by weight and a kinematic viscosity at 100° C. of 4 to 20 $mm^2/s$.

16. An olefin polysulfide according to claim 14, having sulfur content of about 60 to 65% by weight and a kinematic viscosity at 100° C. of 4 to 15 $m^2/s$.

17. A lubricating composition comprising a major proportion of a mineral or synthetic lubricating oil and a minor proportion, sufficient to improve its extreme-pressure properties, of at least one olefin polysulfide according to claim 15.

18. A lubricating composition comprising a major proportion of a mineral lubricating oil and a minor proportion, sufficient to improve its extreme-pressure properties, of at least one olefin polysulfide according to claim 16.

19. An olefin polysulfide obtained by a process according to claim 3.

20. An olefin polysulfide obtained by a process according to claim 4.

21. An olefin polysulfide obtained by a process according to claim 5.

22. An olefin polysulfide obtained by a process according to claim 6.

23. An olefin polysulfide obtained by a process according to claim 7.

24. An olefin polysulfide obtained by a process according to claim 8.

25. An olefin polysulfide obtained by a process according to claim 9.

26. An olefin polysulfide obtained by a process according to claim 10.

27. An olefin polysulfide obtained by a process according to claim 11.

28. An olefin polysulfide obtained by a process according to claim 12.

29. An olefin polysulfide obtained by a process according to claim 13.

30. A lubricating composition comprising a major proportion of a mineral or synthetic lubricating oil and a minor proportion, sufficient to improve its extreme-pressure properties, of at least one olefin polysulfide according to claim 14.

31. A lubricating composition comprising a major proportion of a mineral or synthetic lubricating oil and a minor proportion, sufficient to improve its extreme-pressure properties, of at least one olefin polysulfide according to claim 19.

32. A lubricating composition comprising a major proportion of a mineral or synthetic lubricating oil and a minor proportion, sufficient to improve its extreme-pressure properties, of at least one olefin polysulfide according to claim 20.

33. A lubricating composition comprising a major proportion of a mineral or synthetic lubricating oil and a minor proportion, sufficient to improve its extreme-pressure properties, of at least one olefin polysulfide according to claim 21.

34. A lubricating composition comprising a major proportion of a mineral or synthetic lubricating oil and a minor proportion, sufficient to improve its extreme-pressure properties, of at least one olefin polysulfide according to claim 22.

35. A lubricating composition comprising a major proportion of a mineral or synthetic lubricating oil and a minor proportion, sufficient to improve its extreme-pressure properties, of at least one olefin polysulfide according to claim 23.

36. A lubricating composition comprising a major proportion of a mineral or synthetic lubricating oil and a minor proportion, sufficient to improve its extreme-pressure properties, of at least one olefin polysulfide according to claim 24.

37. A lubricating composition comprising a major proportion of a mineral or synthetic lubricating oil and a minor proportion, sufficient to improve its extreme-pressure properties, of at least one olefin polysulfide according to claim 25.

38. A lubricating composition comprising a major proportion of a mineral of synthetic lubricating oil and a minor proportion, sufficient to improve its extreme-pressure properties, of at least one olefin polysulfide according to claim 26.

39. A lubricating composition comprising a major proportion of a mineral or synthetic lubricating oil and a minor proportion, sufficient to improve its extreme-pressure properties, of at least one olefin polysulfide according to claim 27.

40. A lubricating composition comprising a major proportion of a mineral or synthetic lubricating oil and a minor proportion, sufficient to improve its extreme-pressure properties, of at least one olefin polysulfide according to claim 28.

41. A lubricating composition comprising a major proportion of a mineral lubricating oil and a minor proportion, sufficient to improve its extreme-pressure properties, of at least one olefin polysulfide according to claim 29.

42. A method according to claim 7, wherein in step (2) said adduct and said hydrocarbyl halide are added to a medium containing said sulfur compound and elemental sulfur.

43. An olefin polysulfide obtained by a process according to claim 42.

44. A lubricating composition comprising a major proportion of a mineral or synthetic lubricating oil and a minor proportion, sufficient to improve its extreme-pressure properties, of at least one olefin polysulfide according to claim 43.

45. A method according to claim 1, wherein the aqueous medium in step (2) consists essentially of a mixture of water and a lower aliphatic alcohol.

46. A method according to claim 45, wherein said lower aliphatic alcohol is methanol, ethanol, propanol, isopropanol, n-butanol, isobutanol or tert-butanol.

47. A method according to claim 45, wherein said lower aliphatic alcohol is present in an amount of 2-60% by weight with respect to the water.

48. An olefin polysulfide obtained by a process according to claim 45.

49. A lubricating composition comprising a major proportion of a mineral or synthetic lubricating oil and a minor proportion, sufficient to improve its extreme-pressure properties, of at least one olefin polysulfide according to claim 48.

* * * * *

UNITED STATES PATENT AND TRADEMARK OFFICE
CERTIFICATE OF CORRECTION

PATENT NO. : 4,645,610

DATED : 2-24-87

INVENTOR(S) : Maurice Born et al

Page 1 of 3

It is certified that error appears in the above-identified patent and that said Letters Patent is hereby corrected as shown below:

Column 3, Line 1:

reads: "arylalkyl halides may be substituted. For practical rea-"

Column 3, Line 1:

should read: --and arylalkyl halides may be substituted. For practical rea--

Column 23, Claim 1, Line 12:

reads: "$C_1$ to $C_{12}$ alkyl, $C_5$ to $C_{12}$ cycloalkyl $C_6$ to $C_{12}$"

Column 23, CLaim 1, Line 12:

should read: --$C_1$ to $C_{12}$ alkyl, $C_5$ to $C_{12}$ cycloalkyl, $C_6$ to $C_{12}$--

Column 23, Claim 1, Line 18:

reads: "halide, and with at least one sulfur compound se-"

Column 23, Claim 1, Line 18:

should read: --halide, with at least one sulfur compound se--

UNITED STATES PATENT AND TRADEMARK OFFICE
CERTIFICATE OF CORRECTION

PATENT NO. : 4,645,610

DATED : 2-24-87

INVENTOR(S) : Maurice Born et al

It is certified that error appears in the above-identified patent and that said Letters Patent is hereby corrected as shown below:

column 23, Claim 1, Line 24:

Reads: "halide, and a proportion of elemental sulfur of 0 to"

Column 23, Claim 1, Line 24:

should read: --halide, and with a proportion of elemental sulfur of 0 to--

Column 24, Claim 15, Line 20:

Reads: "ing a sulfur content ranging up to about 45-65% by"

Should read: --ing a sulfur content ranging up to about 45-60% by--

UNITED STATES PATENT AND TRADEMARK OFFICE
CERTIFICATE OF CORRECTION

PATENT NO. : 4,645,610

DATED : 2-24-87

INVENTOR(S) : Maurice Born et al

It is certified that error appears in the above-identified patent and that said Letters Patent is hereby corrected as shown below:

Column 24, Claim 16, Line 24:

Reads: "ing sulfur content of about 60-65% by weight and a"

Column 24, Claim 16, Line 24:

Should Read: --ing a sulfur content of about 60-65% by weight and a--

Signed and Sealed this

Eleventh Day of August, 1987

Attest:

DONALD J. QUIGG

Attesting Officer

Commissioner of Patents and Trademarks